Aug. 16, 1960 S. M. KULUSIC 2,949,065
ATTACHMENT FOR MILLING OR SLOTTING METAL PARTS
Filed Oct. 16, 1957
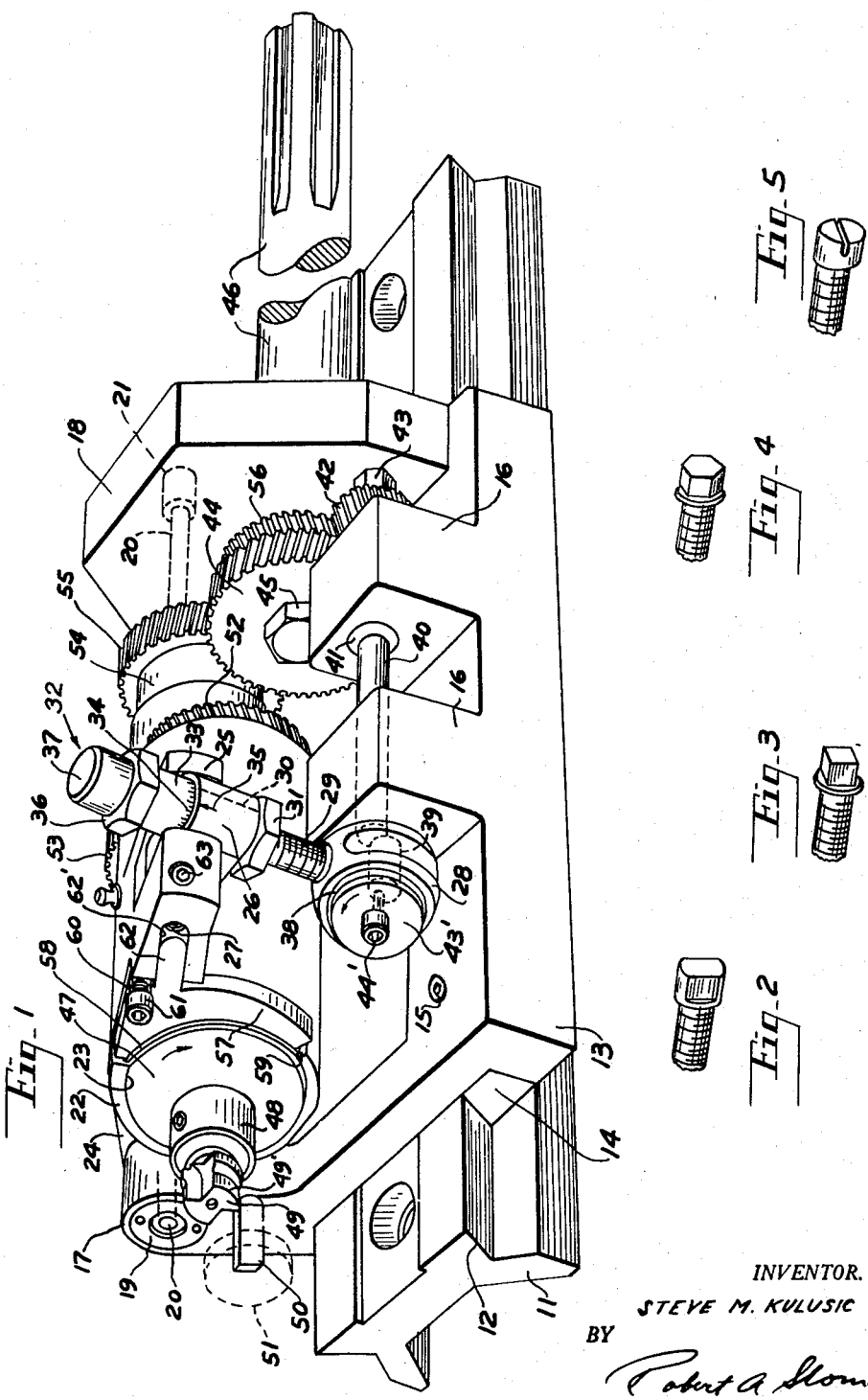
INVENTOR.
STEVE M. KULUSIC
BY
Robert A. Sloman
ATTORNEY

United States Patent Office

2,949,065
Patented Aug. 16, 1960

2,949,065

ATTACHMENT FOR MILLING OR SLOTTING METAL PARTS

Steve M. Kulusic, Warren, Mich.
(P.O. Box 25450, Ryan Road, Centerline, Mich.)

Filed Oct. 16, 1957, Ser. No. 690,530

4 Claims. (Cl. 90—15)

This invention relates to the art of shape turning machined metal parts involving the cutting of flat sides thereof or of straight slots in the ends of such parts.

More particularly, this invention pertains to an apparatus utilizing a rotary cutter for the shape turning of slotted ends or of flat sides on at least a portion of the length of machined metal parts.

It is an object of the invention to provide a novel means for the shape turning of machined metal parts in a single cutting operation for producing slotted ends or flat sides, so that at least a portion of the parts will have cross sectional forms embodying a selective number of flat sides, and which forms for example may be polygonal such as square, hexagonal or octagonal.

It is a further object herein to provide a one to one ratio between the speed of rotation of the drive spindle and the tool holding spindle to thereby result in a slower speed of rotation of the cutter than other types of devices incorporating high ratios, and accordingly producing less wear on the parts and more accurate work.

These and other objects will be seen from the following specifications and claims in conjunction with the appended drawing in which:

Fig. 1 is a perspective partly fragmentary view of the present milling attachment.

Figs. 2, 3, 4 and 5 inclusive, are views in perspective of screws having two-sided, square, hexagonal and slotted heads respectively formed by the cutters rotating at the same speed as that of the screws.

It will be understood that the above drawing illustrates merely a preferred embodiment of the invention and that other embodiments are contemplated within the scope of the claims hereafter set forth.

Referring to the drawing, the present attachment includes the horizontally disposed base 13 adjustably mounted upon the longitudinally disposed slide 11 adapted for positioning upon the end tool slide of an automatic screw machine. Slide 11 includes the dovetail ways 12 over which base 13 is positioned with suitable gibs 14 interposed. Vertically adjustable set screw 15 extends through said base and operatively engages gib 14 for immovably securing base 13 upon slide 11.

Upright longitudinally spaced bosses 16 are arranged upon one side of base 13 and the upright boss 17 is arranged upon the opposite side thereof at its forward end. Upright transverse end plate 18 projects from the rear end of said base.

Nut 19 is threaded and secured within boss 17 and supportably and retainingly receives the outer end of hinge pin 20 which is threaded into said nut. Pin 20 is arranged longitudinally of base 13 and there-above and its headed end 21 is secured within end plate 18 to provide a pivotal mounting for spindle carrier housing 22.

Said housing is arranged longitudinally of the base and along one longitudinal side by extension 24 is pivotally mounted upon hinge pin 20 and accordingly upon base 13, with suitable bearings interposed. The tool spindle carrier housing 22 having a horizontal bore 23 is accordingly adapted for reciprocal vertical movements upon and with respect to base 13.

The bifurcated stirrup 25 projects laterally from the side of housing 22 opposite from its pivotal mounting and is adapted for a swivel or pivotal connection with respect to trunnion 26 hereafter referred to as a continuously movable vertically reciprocal means.

Trunnion 26 is pivotally connected towards its upper end to and within stirrup 25 by means of the pin 27. The lower end of said trunnion is threaded upon screw 29 forming a part of connecting rod 28. Screw 29 threadedly receives the sleeve 30 which is slidably positioned within trunnion 26. And sleeve 30 is secured in adjusted position with respect to screw 29 by means of lock nut 31.

The trunnion is provided with an adjusting and locking screw generally indicated at 32 and which includes as a unit sleeve 33 threaded upon screw 29, the nut 36 and cap 37. Sleeve 33 has a series of calibrations 34 which extend around said sleeve and are suitably marked thereinto for relative adjustment with respect to the stationary marker 35 formed upon trunnion body 26.

For illustration, screw 29 has a 20 pitch thread i.e., 20 threads to the inch; and accordingly one complete rotation of sleeve 33 will raise or lower the same ½₀ of one inch. There are 25 equally spaced calibrations 34. Accordingly manual movement of sleeve 33 the distance between two adjacent calibrations will effect a vertical adjustment of .002 inch.

This adjustment would be employed to take up the tool for any slight wear upon the cutter blades 49'. The adjustment is affected by first loosening lock nut 31 and thereafter moving the trunnion 29 so as to stay in registry with adjusting sleeve 33 during its rotation. Thereafter lock nut 31 is tightened.

A suitable ball bearing 38 including inner and outer races is positioned within the body of the connecting rod 28. The inner race has a longitudinal recess and cooperatively receives therein the eccentric extension 39 upon the end of the eccentric driveshaft 40 which is supported upon and journaled through bosses 16 with bushings 41 interposed.

Helical gear 42 is secured upon the other end of shaft 40 by nut 43. Connecting rod retainer 43' overlies the outer end of connecting rod 28 and includes the fastener 44' which threadedly and retainingly engages axially the outer end of eccentric extension 39 completing the assembly of eccentric driveshaft 40 with the vertically movable means above described.

Preferably helical gear 42 is in mesh with the larger helical gear 44 secured at 45 upon splined drive spindle 46 at one end thereof. Said spindle adjacent said end is supported and journaled through base plate 18. Its opposite end is adapted to be rotatively driven by a suitable drive mechanism forming a part of the conventional screw machine. As this drive mechanism forms no part of the present invention except as it supplies power further description thereof is omitted.

The conventional screw machine to which the present attachment is adapted also includes a power operated rotatably driven spindle of a conventional nature upon which is axially secured a suitable collet 51 for holding a workpiece 50, such as shown in Figs. 2, 3, 4 and 5.

There is provided suitable power mechanism not shown by which said collet is rotatably driven at the same speed as tool spindle 47.

In the present preferred embodiment of the invention gear 44 has 60 teeth and gear 42 has 15 teeth, i.e., a ratio of four to 1. This means that for this arrangement eccentric shaft 40 will rotate 4 times as fast as the tool carrying spindle 47 which carries the tool holder 48 and the particular cutting tool 49 with blades 49'.

Said blades extend radially outward from the center of the cutter in a direction perpendicular to the cutter axis for the purpose of cutting flat sides on the workpiece 50 when said workpiece and said cutter are rotating simultaneously in the same relative direction and in relative adjusted cutting position.

Spindle 47 is journaled within spindle carrier housing 22 with suitable bearings interposed. Said spindle extends longitudinally through housing 22 and at its inner end has secured thereto helical gear 52. This gear meshes with similar gear 53.

This gear has pinned thereto a bushing 54 which carries at its outer end the similar helical gear 55 defining a gear cluster for movement in unison. Gear 55 meshes with a similar helical gear 56 secured upon drive spindle 46 upon the interior of end plate 18. All of the gears 44, 52, 53, 55 and 56 have the same number of teeth and all rotate at the same speed.

Referring to Fig. 1, an arcuate brake element 57 is mounted upon spindle housing 22 upon one side thereof, adjacent its forward end, and mounted upon its interior surface is a suitable brake lining 58. Housing 22 is arcuately cut-away at 59 to cooperatively receive the sector shaped brake 57 whose lining is adapted for continuous engagement with spindle 47 for applying the desired brake pressure thereto and to thus prevent backlash during operation of the attachment.

Brake 57 has a horizontally slotted upper end portion defining the support plate 60 through which transversely extends bolt 61 in threaded engagement with housing 22 and providing a support for said brake whereby the same may be adjusted radially of the spindle. Said brake also has a lateral extension 62 slidably received within the laterally extending undercut slot 62' formed within stirrup 25. Adjusting screw 63 extends radially inward through said stirrup operatively engaging extension 62 providing adjusting means for regulating the pressure of engagement of the brake lining upon spindle 47.

By the present construction the tool carrying spindle 47 rotates at a one to one ratio with respect to collet 51 and the workpiece 50. In order to achieve the cutting of angularly related flat surfaces upon the workpiece it is necessary that there be during rotation of the cutter continuous vertical adjustment of the spindle carrying housing with respect to the base, and accordingly corresponding adjustment of the cutting tool 49 with respect to the workpiece.

The 4 to 1 ratio above described with respect to eccentric driveshaft 40 provides such continuous vertical adjustments of the spindle carrier housing so that the cutter will achieve in the workpiece either one flat surface, two flat surfaces or four flat surfaces.

The cutter 49 shown in Fig. 1 is a two bladed cutter used for cutting a pair of opposed flats in the workpiece, such as shown in Fig. 2. If it is desired to cut a single flat surface upon the workpiece then cutter 49 would be replaced by a cutter having a single cutting blade extending radially of the axis of rotation.

Using the attachment for cutting four angularly related flats such as in Fig. 3, the cutter employed would include four angularly related blades. Should it be desired to cut eight flat surfaces in the workpiece the gear ratio between the gears 44 and 42 would be preferably 8 to 1 rather than four to one. At the same time a cutting tool would be employed which included at least four cutting blades, possibly eight.

Should it be desired to cut in the workpiece three angularly related flats, then the ratio of gear teeth between the gears 44 and 42 would be six to one and at the same time the cutting tool 49 would have three angularly related cutting blades.

Using this ratio, a workpiece of six angularly related flats such as shown in Fig. 4 would be achieved using a cutting tool having six angularly related blades.

Should it be desired to cut a straight slot in the end of a workpiece as in Fig. 5, then the blade of the rotary cutter would project in a direction parallel to the axis of said cutter and from a radially outer portion thereof.

In operation by maintaining the work spindle and work 50 stationary the present attachment may be used for cutting internal axial openings in a work of square, hexagonal or other cross section.

Having described my invention, reference should now be had to the following claims.

I claim:

1. An attachment of the character described comprising in combination, a base, a drive spindle adapted to be rotatably driven through one end thereof by drive mechanism and journaled and supported on said base, a tool spindle carrier housing arranged longitudinally of the base and pivotally mounted along one longitudinal side upon said base adapted for reciprocal vertical movements thereon, continuously movable vertically reciprocal means pivotally joined to the opposite side of said housing, a tool spindle rotatably journaled in said housing axially thereof, a longitudinally disposed driveshaft journaled on said base including at one end an eccentric extension rotatably connected with said vertically reciprocal means, a bladed cutter secured to one end of said tool spindle, gearing operatively connecting the other end of said drive spindle to the other end of said tool spindle for rotation at the same speeds, and additional speed change gearing operatively connecting the other end of said drive spindle with the other end of said driveshaft for rotation at proportionately higher speeds.

2. The attachment of claim 1, a portion of said housing being arcuately cutaway adjacent said tool spindle defining an arcuate slot, an arcuate brake element nested in said slot having a lining bearing against said spindle, a lateral boss on said housing outwardly of said slot and having an internal radial guideway therein, a radial extension on said brake element transversely slidable in said guideway, and adjustable means on said boss operatively engaging said extension whereby desired braking pressure is continuously applied to said tool spindle to prevent backlash during operation of the attachment.

3. The attachment of claim 1, said reciprocal vertically movable means including a trunnion pivoted onto said housing, a connecting rod swivelly joined at one end to said eccentric extension and at its other end joined to said trunnion, and means to adjust the connection of said rod with said trunnion.

4. The attachment of claim 1, the pivotal mounting of said tool spindle carrier housing along said one longitudinal edge consisting of a longitudinally disposed hinge pin mounted upon and above said base, the pivotal connection between said housing and vertically reciprocal means consisting of a sleeve adjustably threaded on said reciprocal means, a nut on said reciprocal means engaging one end of said sleeve, a clevis projecting laterally from one side of said housing away from said pin, a trunnion slidably mounted on said sleeve so as to bear against said nut, and projecting through said clevis, means pivotally connecting said trunnion to said clevis, and an adjusting cap nut threaded upon said reciprocal means retainingly bearing against said trunnion.

References Cited in the file of this patent

UNITED STATES PATENTS

| 650,766 | Anderson | May 29, 1900 |
| 2,392,819 | Gruenberg et al. | Jan. 15, 1946 |
| 2,475,539 | Beauchemin | July 5, 1949 |

FOREIGN PATENTS

| 164,919 | Germany | Nov. 9, 1905 |
| 625,712 | France | Apr. 30, 1927 |
| 1,101,296 | France | Apr. 20, 1955 |